(12) United States Patent  
Gulick, Jr.

(10) Patent No.: US 8,985,544 B1
(45) Date of Patent: Mar. 24, 2015

(54) ANTI-THEFT DEVICE FOR FUNCTIONAL DISPLAY OF HANDHELD DEVICES

(75) Inventor: Franklyn W. Gulick, Jr., Binghamton, NY (US)

(73) Assignee: Scorpion Security Products, Inc., Binghamton, NY (US)

( * ) Notice: Subject to any disclaimer, the term of this patent is extended or adjusted under 35 U.S.C. 154(b) by 0 days.

(21) Appl. No.: 12/069,479

(22) Filed: Feb. 11, 2008

Related U.S. Application Data

(63) Continuation-in-part of application No. 11/481,486, filed on Aug. 29, 2006, now abandoned.

(51) Int. Cl.
*F16M 13/00* (2006.01)

(52) U.S. Cl.
USPC ............ 248/551; 248/309.1; 248/176.1; 248/346.03; 269/249; 269/156

(58) Field of Classification Search
USPC ........... 269/45, 43, 71, 55, 249, 258, 279, 44, 269/156; 70/19; 248/154, 346.03, 346.07, 248/913, 122.1, 176.1, 309.1, 313, 316.1, 248/316.2, 316.6, 551, 670, 371
See application file for complete search history.

(56) References Cited

U.S. PATENT DOCUMENTS

| | | | | |
|---|---|---|---|---|
| 19,622 A | * | 3/1858 | Clark | 269/172 |
| 242,959 A | * | 6/1881 | Naglee | 269/156 |
| 297,981 A | * | 5/1884 | Francis | 81/4 |
| 339,072 A | * | 3/1886 | Nies | 269/249 |
| 351,550 A | * | 10/1886 | Weller | 81/155 |
| 528,557 A | * | 11/1894 | Peabody | 269/71 |
| 685,078 A | * | 10/1901 | Willringhaus | 269/120 |
| 762,070 A | * | 6/1904 | Longard | 269/127 |
| 774,810 A | * | 11/1904 | Willis | 72/360 |
| 887,103 A | * | 5/1908 | Lane | 269/156 |
| 1,075,384 A | * | 10/1913 | Seidel | 269/156 |
| 1,402,621 A | * | 1/1922 | Knittel et al. | 269/156 |
| 1,586,314 A | * | 5/1926 | Michael Kiefer | 269/156 |
| 1,709,385 A | * | 4/1929 | Young | 269/156 |
| 2,094,225 A | * | 9/1937 | Tuttle | 82/172 |
| 2,114,227 A | * | 4/1938 | Kriss | 269/145 |
| 2,225,273 A | * | 12/1940 | Jacobs | 269/60 |
| 2,424,871 A | * | 7/1947 | Wenk et al. | 72/313 |
| 2,552,094 A | * | 5/1951 | Hamon et al. | 269/156 |
| 2,610,661 A | * | 9/1952 | Romine | 269/156 |
| 2,716,362 A | * | 8/1955 | Novak | 269/103 |
| 3,741,517 A | * | 6/1973 | Pogonowski | 251/5 |
| 3,855,825 A | * | 12/1974 | Pickard | 70/14 |
| 4,083,547 A | * | 4/1978 | Gurley | 269/156 |
| 4,234,176 A | * | 11/1980 | Goff et al. | 269/156 |
| 5,052,199 A | * | 10/1991 | Derman | 70/58 |
| 5,246,183 A | | 9/1993 | Leyden | |
| 5,463,688 A | * | 10/1995 | Wijas | 379/446 |
| 5,555,302 A | | 9/1996 | Wang | |
| RE35,677 E | * | 12/1997 | O'Neill | 248/551 |
| 5,697,601 A | * | 12/1997 | Gurule | 269/43 |
| 5,825,874 A | * | 10/1998 | Humphreys et al. | 379/446 |
| 5,848,562 A | * | 12/1998 | Somma | 82/158 |
| 5,863,033 A | * | 1/1999 | Bradford | 269/3 |
| 5,893,553 A | * | 4/1999 | Pinkous | 269/249 |

(Continued)

*Primary Examiner* — Kimberly Wood
(74) *Attorney, Agent, or Firm* — Hiscock & Barclay LLP

(57) ABSTRACT

An anti-theft apparatus for gripping mobile phones and other handheld items to allow secure marketing display of the handheld products. The anti-theft device grips a handheld product in legs, which are manually screwed tight by rotating a specially shaped key that fits into a similarly shaped slot aligned on the axis of a draw pin. The draw pin tightens and loosens the legs around the handheld device.

14 Claims, 6 Drawing Sheets

(56) References Cited

U.S. PATENT DOCUMENTS

| | | | |
|---|---|---|---|
| 5,903,645 A | 5/1999 | Tsay | |
| 6,000,686 A * | 12/1999 | Yates | 269/6 |
| 6,002,921 A | 12/1999 | Pfahlert et al. | |
| 6,161,823 A * | 12/2000 | Bradford | 269/3 |
| 6,176,479 B1 * | 1/2001 | Hicklin | 269/156 |
| 6,199,804 B1 * | 3/2001 | Donofrio, Jr. | 248/121 |
| 6,220,589 B1 * | 4/2001 | Smith, III et al. | 269/156 |
| 6,237,375 B1 * | 5/2001 | Wymer | 70/14 |
| 6,659,382 B2 | 12/2003 | Ryczek | |
| 6,848,662 B2 * | 2/2005 | Paramonoff et al. | 248/309.1 |
| 7,111,764 B2 * | 9/2006 | Smith et al. | 224/319 |
| 7,197,962 B2 * | 4/2007 | Williams | 81/53.12 |

* cited by examiner

ANTI-THEFT DEVICE FOR FUNCTIONAL DISPLAY OF HANDHELD DEVICES

RELATED APPLICATIONS

This patent application is a continuation-in-part of copending U.S. patent application Ser. No. 11/481,486, filed Jul. 6, 2006, and incorporates by reference the subject matter thereof.

FIELD OF THE INVENTION

The invention relates to security devices for allowing display of handheld products and, more particularly, to a universal clamping apparatus to prevent theft of handheld electronic devices without hindering customer inspection thereof.

BACKGROUND OF THE INVENTION

Retailers sell light weight wireless phones, handheld computers, radios, scanners, pagers, GPS systems, multimeters, cameras, music players, power tools, calculators, and similar electronic devices to the public in a range of shapes and sizes, with a range of functionality. Encouraging customers to pick up, hold, examine, and use the features of the devices is a valuable marketing technique employed by retailers. To decrease the risk of theft associated with this marketing strategy, retailers often further employ security measures to physically retain the electronic device within a short distance from its display location. Current security devices that allow customers to manipulate displayed electronic devices are often designed for specific types, brands, sizes, or shapes. Current security devices that claim to fit handheld electronics universally, in fact, do not. These security devices are bulky and obtrusive, blocking full customer inspection of features.

For example, U.S. Pat. No. 6,659,382 issued Dec. 9, 2003 to Ryczek discloses a security device by which cell phones or similar handheld electronic devices can be fastened within a clamp and tethered to a display location. The clamp consists of an upper jaw and a lower jaw. A flange with a hole protrudes perpendicularly off the dorsal side of each jaw for a screw to pass through and tighten the jaws together. Up to six sides of an electronic device are thereby fastened within the upper and lower jaws. Other than the one-dimensional range of the screw's length, the security device is not adjustable to fit varying sizes and types of electronic devices. Multiple models must be designed for specific types, sizes, or shapes of electronic handheld devices. Additionally, clamping on up to six sides of electronic devices, including but not limited to slide and flip-top wireless phones, inhibits customer inspection of some features and functionality.

Some attempts have been made to devise anti-theft devices that allow functional use of items. For instance, U.S. Pat. No. 5,246,183 issued on Sep. 21, 1993 to Leyden discloses an anti-theft device for use with television remote controls in locations such as hotels and motels. A flat disk at the end of a tether retracts to a base. Adhesive attaches the flat disk to a flat surface of the remote control. The attaching disk is not intended to be used with various types of items, and it is not intended for repeat attachment and detachment.

Other mobile phone clamps and holders are intended for repeat attachment and detachment. U.S. Pat. No. 5,903,645 issued May 11, 1999 to Tsay, and U.S. Pat. No. 5,555,302 issued Sep. 10, 1996 to Wang disclose devices that clamp cell phones on the sides. Each holder uses an easily and quickly releasable mechanism, such as a spring mechanism, to grip a cell phone on the sides. These devises are not intended to prevent theft, but rather to temporarily hold and facilitate use of a cell phone under certain conditions, such as driving.

U.S. Pat. No. 6,002,921 issued Dec. 14, 1999 to Pfahlert et al. discloses a lockable cradle for holding a radiotelephone. A radio signal is used to lock and unlock the arms that clamp around the sides of a phone. This anti-theft device is not intended to display or use the radiotelephone and all its features while locked in the cradle. It has a mating system to attach to a base, rendering a locked item unable to be held and manipulated while locked to a location.

It would be advantageous to provide a universal anti-theft device for electronics that mounts to an array of types, shapes, sizes, and brands thereof.

It would be advantageous to provide an anti-theft device that encourages handling and manipulation of electronic products.

It would be advantageous to provide an anti-theft device that minimizes restriction of gripped product features and functions during manipulation and inspection.

It would be advantageous to provide an anti-theft device that easily attaches and detaches from gripped products.

It would be advantageous to provide an anti-theft device that is perdurable.

It would be advantageous to provide an anti-theft device that attaches to existing retaining and positioning systems.

SUMMARY OF THE INVENTION

In accordance with the present invention, there is provided an anti-theft device for gripping handheld electronics and fastening them to a display location. A drive gear is powered manually by a special key, driving at least one axle gear. As the axle gears turn, the screwing motion contracts and expands legs to tighten and loosen their grip on the handheld devices.

Containing only three sides enables the anti-theft device to operate with a greater range of types, sizes, and shapes of handheld devices. The device may attach to a tether or other similar retracting and/or positioning system.

BRIEF DESCRIPTION OF THE DRAWINGS

A complete understanding of the present invention may be obtained by reference to the accompanying drawings, when considered in conjunction with the subsequent, detailed description, in which.

For purposes of brevity and clarity, like components and elements of the apparatus of this invention will bear the same designations or numbering throughout the FIGURES.

DETAILED DESCRIPTION OF THE PREFERRED EMBODIMENT

In accordance with the present invention, an anti-theft apparatus is provided for gripping mobile phones, cameras, computers, radios, scanners, pagers, GPS systems, and similar electronic devices to allow secure marketing display of the handheld products. The gripping device has a body with an upper surface, a first arm with a distal end and a second arm having a distal end. Also provided is a device for extending and retracting the first and second arms along an X-axis relative to respective first and second sides of the body. A leveling plate is movably connected to the body between the first and second arms. Also, the leveling plate can move along a Z-axis relative to the upper surface of the body.

Figure 1:
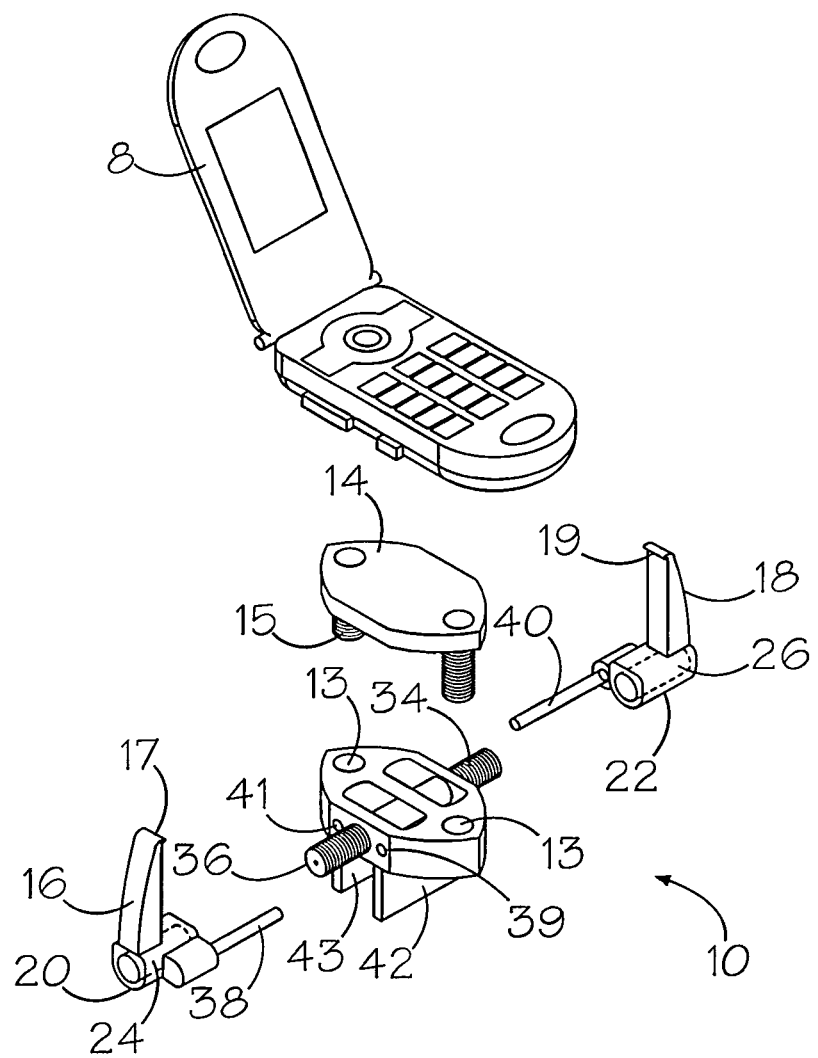
FIG. 1 is an exploded perspective view of the anti-theft device in accordance with the invention, with cell phone shown in proper alignment for attachment thereto.

Referring now to FIGS. 1 through 5, and as best seen in FIG. 1, the invention is shown to include a retention device 10 for securely holding a cell phone 8.

Figure 3A:
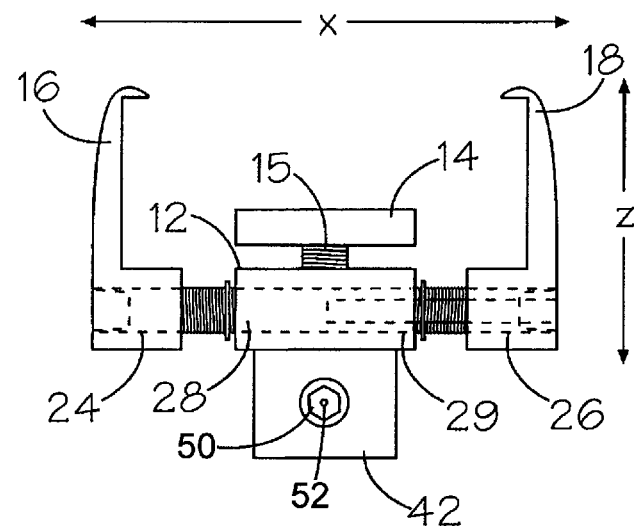
FIG. 3a is a front view of the anti-theft device.
Figure 3B:
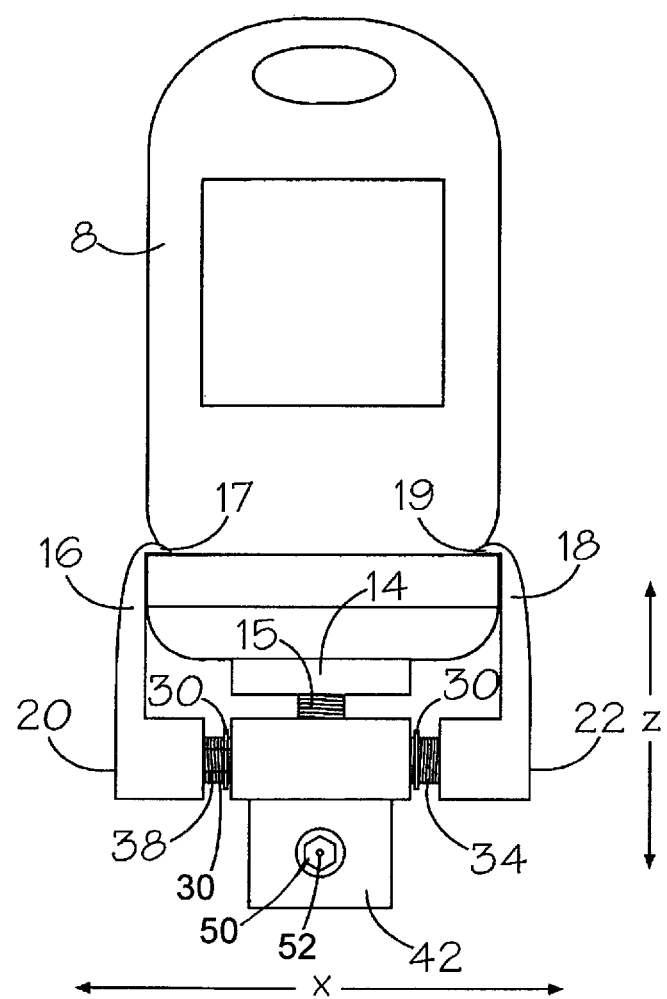
FIG. 3b is a front view of the device, with cell phone attached therein.

As seen in FIG. 3a, retention device 10 comprises a moveable shim plate 14 and first moveable arm 16 and a second moveable arm 18. Shim plate 14 moves vertically in alignment with the Z axis; first moveable arm 16 and second moveable arm 18 move horizontally in alignment with the X axis.

Figure 2A:
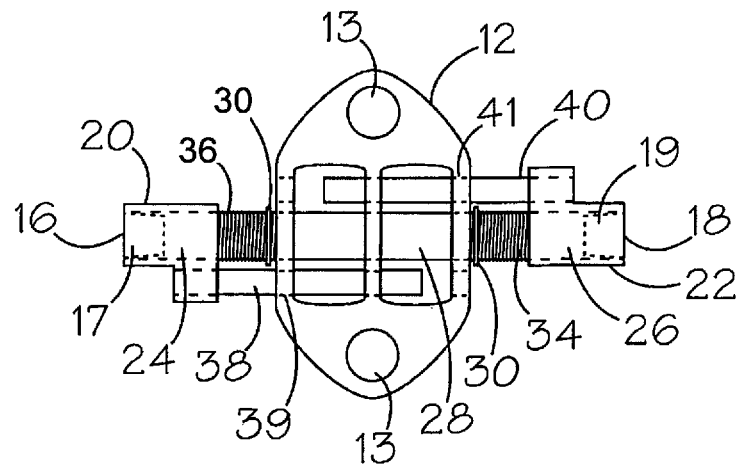
FIG. 2a is a top view of the main housing body, absent the top plate.
Figure 2B:
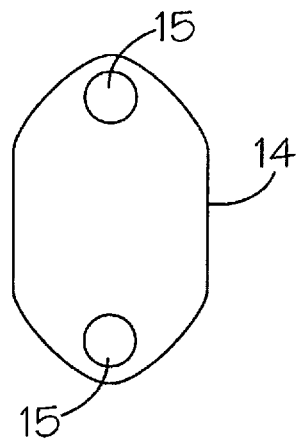
FIG. 2b is a top view of the top plate.
Figure 2C:
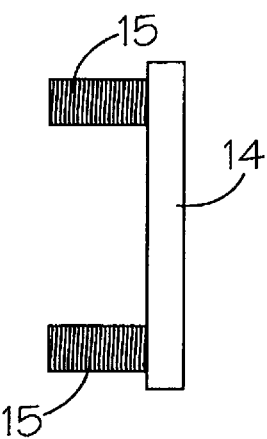
FIG. 2c is a side view of the top plate.

As best seen in FIGS. 2a and 2a, the horizontal movement of first moveable arm 16 and second moveable arm 18 along the X axis is controlled by the rotation of draw pin 28, which retains two threaded ends 34, 36, each of which is machined with a thread pattern that is counter rotational to the other. Correspondingly, threaded hole 24 in arm base 20 and threaded hole 26 in arm base 22 are each machined with a thread pattern that is counter rotational to the other. Threaded end 36 is complementary to threaded hold 24, while threaded end 34 is complementary to threaded hole 26. Therefore, it is critical to function that threaded end 36 is inserted into threaded hole 24, while threaded end 24 is inserted into threaded hole 26.

A draw pin 28 extends through the center of housing body 12 via hole 29. Draw pin 28 is held in place by lock washer 30, which is attached at opposing end portions of draw pin 28 and so positioned to abut the side walls of housing body 12.

As best seen in FIGS. 3a through 4b, the rotation of draw pin 28 is controlled by inserting a suitable tool (not shown) into hex key hole 32 at the tip of threaded end 34 of draw pin 28. Disposed with hex key hole 32 is a security pin 33 (FIGS. 4a, 5) that can be turned by the suitable tool. When the hex key is inserted and rotated clockwise, draw pin 28 is simultaneously rotated in a clockwise direction. This screws the opposing threaded ends 34 and 36 into threaded holes 26 and 24, respectively, which serves to draw first moveable arm 16 and second moveable arm 18 towards one another, and towards the center of housing body 12. Conversely, when draw pin 20 is rotated in a counter clockwise direction, first moveable arm 16 and second moveable arm 18 are drawn away from each other, and away from the center of housing body 12. In this fashion, first moveable arm 16 and second moveable arm 18, as well as optional retention hooks 17 and 19, can be infinitely adjusted to clamp onto and securely hold the sides and top edges of cell phone 8.

While the width, or range, of lateral movement of first moveable arm 16 and second moveable arm 18 is arbitrarily dependent upon the electronic device that is to be retained, the range for the embodiment shown herein is approximately 3.125" at the widest adjustment and approximately 0.702" at the narrowest adjustment.

As best seen in FIG. 2a, locator pins 38 and 40 are fixedly attached to arm bases 20 and 22, respectively. Locator pin 38 extends through locator hole 39; locator pin 40 extends through locator hole 41. Each pin 38, 40 is parallel to the axis of draw pin 28, and in the same plane thereof. As draw pin 28 is rotated, thereby moving first moveable arm 16 and second moveable arm 18 into a wider or narrower adjustment state, locater pins 38 and 40 slide correspondingly through locator holes 39 and 41.

As seen in FIGS. 2a and 3a, locator pins 38 and 40 function as stabilizer means to prevent arm bases 20 and 22 from deviating from their fixed alignment, which in turn maintains the perpendicular alignment of first moveable arm 16 and second moveable arm 18 as they move through various states of adjustment as described above.

As seen in FIGS. 2b through 4b, the vertical movement of shim plate 14 along the Z axis is controlled by the rotation of one or more threaded shim pins 15, which are fixedly attached to each end of shim plate 14. Here, it is important to note that while shim pins 15 are fixedly attached to shim plate 14, pins 15 are attached in a manner that allows the full and unencumbered rotation of threaded shim pins 15 in both clockwise and counter clockwise directions.

Figure 5:
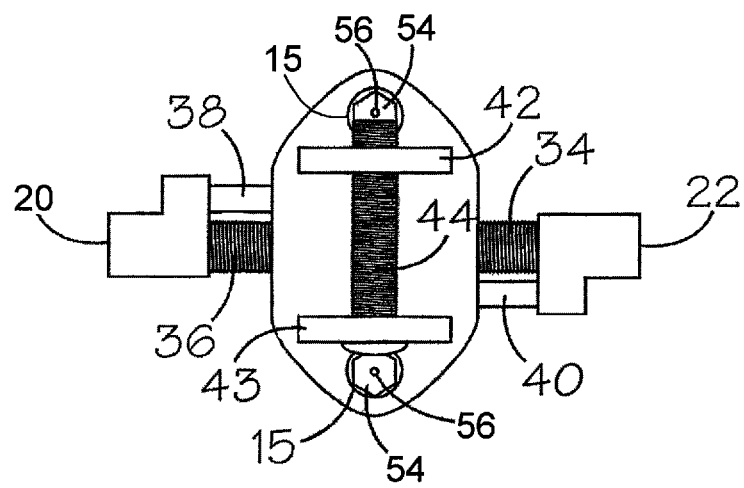
FIG. 5 is a bottom view of the device.

As seen in FIG. 5, the free end of each of shim pins 15, not fixedly attached to shim plate 14, retains hex key hole, retains a corresponding hex key hole 54. When a hex key is inserted into one of hex key holes 54 and rotated, the corresponding shim pin 15 rotates clockwise or counter-clockwise.

Figure 4A:
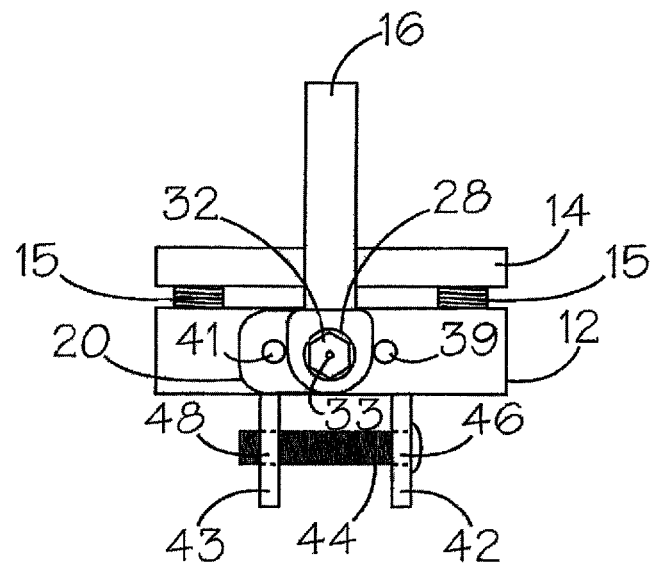
FIG. 4a is a side view of the device.
Figure 4B:
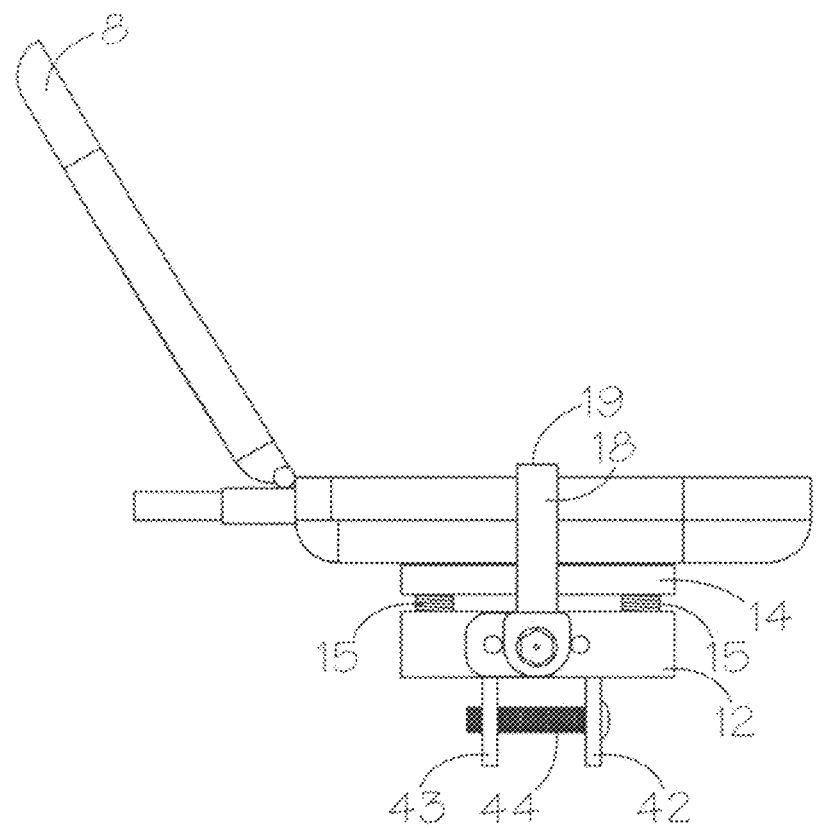
FIG. 4b is a side view of the device, with a cell phone attached therein.

As best seen in FIGS. 4a and 4b, when shim pins 15 are rotated clockwise into threaded holes 13, shim pins 15 rise along the threads of threaded holes 13, thereby elevating the end of pins 15 that are fixedly attached to shim plate 14. In this manner, shim plate 14 may be elevated in a gradual and controlled manner. Conversely, when threaded shim pins 15 are rotated in a counter-clockwise direction, shim plate 14 is lowered along the threads of threaded holes 13 in a likewise gradual and controlled manner. While the elevating distance of shim plate 14 is arbitrarily dependent upon the size of the electronic device retained, the elevating distance for the embodiment described herein is approximately 0.65 inches.

As best illustrated in FIGS. 4a and 4b, each end of shim plate 14 may be raised or lowered, by alternate turn in graduated increments, thereby raising or lowering plate 14 in a level manner. This allows shim plate 14 to function substantially as a screw type jack to elevate cell phone 8 and press it securely against optional retention hooks 17 and 19, thereby holding cell phone 8 fixedly between shim plate 14 and retention hooks 17, 19.

As best seen in FIGS. 4a through 5, attachment flanges 42 and 43 extend from the bottom portion of housing body 12. Attachment flange 42 retains hole 46; attachment flange 43 retains threaded hole 48. Threaded attachment pin 44 inserts freely through hole 46 and thence to threaded hole 48. When threaded attachment pin 44 is fully seated in threaded hole 48, means is provided to allow retention device 10 to be securely attached to any number or variation of display fixtures and systems that are commonly utilized by the retail trade to safeguard valuable goods. This security feature is enhanced by the fact that the head of attachment pin 44 retains a hex key hole 50, thereby requiring a tool or key of certain size for removal, a specialty tool rarely carried by the average consumer, or even the average consumer inclined to shoplift goods from a retail establishment. Disposed with hex key hole 50 can be security pin 52.

Referring again to FIGS. 1 through 5, it is seen that retention device 10 is adjustable to accommodate the width and height of virtually any cell phone in use today, and to securely grip and hold virtually any cell phone in a manner that allows full use and inspection of all relevant features of the cell phone by consumers at a retail location where the cell phone is displayed for sale.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A security device for a handheld electronic device, the handheld electronic device having a first side, a second side, a front surface, and a back surface, the security device comprising:
   a body having a first side, a second side, a first end, a second end, and an upper surface;
   a first arm extending from the first side of the body and having a distal end, wherein the distal end of the first arm has a first retention hook extending horizontally from the distal end of the first arm above the plane of the upper surface of the body;
   a second arm extending from the second side of the body and having a distal end, wherein the distal end of the second arm has a second retention hook extending horizontally from the distal end of the second arm above the plane of the upper surface of the body;
   a draw pin extending through the first side and the second side of the body for moving the first arm and the second arm simultaneously along an X-axis relative to the first side and the second side of the body to secure the first arm against the first side of the handheld electronic device and to secure the second arm against the second side of the handheld electronic device, wherein the draw pin comprises a first threaded end and second threaded end, wherein the first threaded end has a thread pattern that is counter rotational to the thread pattern of the second threaded end; and
   a leveling plate having a first end and second end, wherein the leveling plate is located between the first arm and the second arm and proximate to the upper surface of the body, wherein the first end of the leveling plate is connected to the first end of the body using a first leveling screw and the second end of the leveling plate is connected to the second end of the body using a second leveling screw to allow the first end of the leveling plate and the second end of the leveling plate to move independently of each other and independently of the body along a Z-axis relative to the upper surface of the body,
   wherein the first leveling screw is fixedly attached to the first end of the leveling plate and the second leveling screw is fixedly attached to the second end of the leveling plate,
   wherein the leveling plate is not integral with the first leveling screw or the second leveling screw,
   wherein the first leveling screw is configured to secure the first end of the leveling plate against the back surface of the handheld electronic device and the second leveling screw is configured to secure the second end of the leveling plate against the back surface of the handheld electronic device, and
   wherein the leveling plate is configured to apply force to the back surface of the handheld electronic device to secure the first and second retention hooks against the front surface of the handheld electronic device.

2. The security device of claim 1, wherein the draw pin is configured to be operated with a hex wrench tool inserted into the draw pin.

3. The security device of claim 2, wherein the draw pin includes a hex key hole for receiving the hex wrench tool.

4. The security device of claim 1, wherein the first leveling screw is configured to be operated with a hex wrench tool inserted into the first leveling screw.

5. The security device of claim 4, wherein the first leveling screw includes a hex key hole for receiving the hex wrench tool.

6. The security device of claim 1, wherein the first leveling screw is threaded into the first end of the body and the second leveling screw is threaded into the second end of the body.

7. The security device of claim 1, wherein the first end of the leveling plate and the second end of the leveling plate form an integral component.

8. A security device for a handheld electronic device, the handheld electronic device having a first side, a second side, a front surface, and a back surface, the security device comprising:
   a body having a first side, a second side, a first end, a second end, and an upper surface;
   a first arm extending from the first side of the body;
   a second arm extending from the second side of the body;
   a draw pin extending through the first side and the second side of the body for moving the first arm and the second arm simultaneously along an X-axis relative to the first side and the second side of the body to secure the first arm against the first side of the handheld electronic device and to secure the second arm against the second side of the handheld electronic device, wherein the draw pin comprises a first threaded end and second threaded end, wherein the first threaded end has a thread pattern that is counter rotational to the thread pattern of the second threaded end; and
   a leveling plate having a first end and second end, wherein the leveling plate is located between the first arm and the second arm and proximate to the upper surface of the body, wherein the first end of the leveling plate is connected to the first end of the body using a first leveling screw and the second end of the leveling plate is connected to the second end of the body using a second leveling screw to allow the first end of the leveling plate and the second end of the leveling plate to move independently of each other and independently of the body along a Z-axis relative to the upper surface of the body,
   wherein the first leveling screw is fixedly attached to the first end of the leveling plate and the second leveling screw is fixedly attached to the second end of the leveling plate,
   wherein the leveling plate is not integral with the first leveling screw or the second leveling screw, and
   wherein the first leveling screw is configured to secure the first end of the leveling plate against the back surface of the handheld electronic device and the second leveling screw is configured to secure the second end of the leveling plate against the back surface of the handheld electronic device.

9. The security device of claim 8, wherein the draw pin is configured to be operated with a hex wrench tool inserted into the draw pin.

10. The security device of claim 9, wherein the draw pin includes a hex key hole for receiving the hex wrench tool.

11. The security device of claim 8, wherein the first leveling screw is configured to be operated with a hex wrench tool inserted into the first leveling screw.

12. The security device of claim 11, wherein the first leveling screw includes a hex key hole for receiving the hex wrench tool.

13. The security device of claim 8, wherein the first leveling screw is threaded into the first end of the body and the second leveling screw is threaded into the second end of the body.

14. The security device of claim 8, wherein the first end of the leveling plate and the second end of the leveling plate form an integral component.

* * * * *